US009705562B2

(12) United States Patent
Hurwitz et al.

(10) Patent No.: US 9,705,562 B2
(45) Date of Patent: Jul. 11, 2017

(54) DUAL TRANSFORMER COMMUNICATION INTERFACE

(75) Inventors: Jonathan Ephriam David Hurwitz, Edinburgh (GB); David Gimenez Rocamora, Barcelona (ES)

(73) Assignee: BROADCOM EUROPE LIMITED, London (GB)

( * ) Notice: Subject to any disclaimer, the term of this patent is extended or adjusted under 35 U.S.C. 154(b) by 1947 days.

(21) Appl. No.: 12/144,511

(22) Filed: Jun. 23, 2008

(65) Prior Publication Data

US 2009/0315700 A1   Dec. 24, 2009

(51) Int. Cl.
*H04B 3/56* (2006.01)
*H04B 3/54* (2006.01)

(52) U.S. Cl.
CPC ............ *H04B 3/56* (2013.01); *H04B 3/54* (2013.01); *H04B 2203/5483* (2013.01)

(58) Field of Classification Search
CPC ...................................................... H04B 3/54
USPC .................................................... 307/1
See application file for complete search history.

(56) References Cited

U.S. PATENT DOCUMENTS

| | | | | |
|---|---|---|---|---|
| 3,696,383 A | * | 10/1972 | Oishi et al. | 340/538.11 |
| 3,962,547 A | * | 6/1976 | Pattantyus-Abraham | 307/3 |
| 4,038,601 A | * | 7/1977 | Laborie et al. | 375/219 |
| 4,066,912 A | * | 1/1978 | Wetherell | 307/3 |
| 4,210,901 A | * | 7/1980 | Whyte et al. | 340/9.1 |
| 4,504,705 A | * | 3/1985 | Pilloud | 381/77 |
| 4,636,711 A | | 1/1987 | Freymuth | |
| 4,697,166 A | * | 9/1987 | Warnagiris et al. | 375/258 |
| 4,772,870 A | | 9/1988 | Reyes | |
| 4,864,589 A | * | 9/1989 | Endo | 375/141 |
| 4,973,940 A | * | 11/1990 | Sakai et al. | 375/258 |
| 5,066,939 A | * | 11/1991 | Mansfield, Jr. | 455/402 |
| 5,210,519 A | * | 5/1993 | Moore | 375/258 |
| 5,289,199 A | * | 2/1994 | Viereck | 343/745 |

(Continued)

FOREIGN PATENT DOCUMENTS

| | | |
|---|---|---|
| EP | 1134909 A1 | 9/2001 |
| EP | 1351408 B1 | 10/2003 |

(Continued)

OTHER PUBLICATIONS

Yukitoshi, Sanada, A Multiuser Interference Cancellation Technique Utilizing Convolutional Colds and Orthogonal Multicarrier Modulation for Wireless Indoor Communications, IEEE Journal of Selected Areas in Communications, vol. 14, No. 8, Oct. 1996, pp. 1500-1508.

(Continued)

*Primary Examiner* — Adi Amrany
(74) *Attorney, Agent, or Firm* — Garlick & Markison; Randy W. Lacasse

(57) ABSTRACT

A power line communication device comprises a plurality of transformers in series. These transformers are used to increase the voltage of a digitally encoded signal in a stepwise fashion prior to being coupled into a power line. While a transmit path includes at least a first transformer and a second transformer in series, a receive path may include only one of these two transformers. For example a receive path may include only the first transformer, or include the first transformer and a third transformer. The net ratio of voltage increase and decrease may be different in the transmit and receive paths.

20 Claims, 6 Drawing Sheets

(56) References Cited

U.S. PATENT DOCUMENTS

| | | | |
|---|---|---|---|
| 5,406,249 A * | 4/1995 | Pettus | 370/389 |
| 5,559,377 A * | 9/1996 | Abraham | 307/104 |
| 5,574,748 A | 11/1996 | Vander Mey et al. | |
| 5,770,996 A * | 6/1998 | Severson et al. | 340/538.16 |
| 5,777,544 A | 7/1998 | Vander Mey et al. | |
| 5,796,604 A * | 8/1998 | Le Van Suu | 700/3 |
| 5,929,750 A | 7/1999 | Brown | |
| 5,933,071 A | 8/1999 | Brown | |
| 6,014,386 A | 1/2000 | Abraham | |
| 6,243,413 B1 | 6/2001 | Beukema | |
| 6,313,738 B1 * | 11/2001 | Wynn | 307/3 |
| 6,373,377 B1 | 4/2002 | Sacca et al. | |
| 6,396,392 B1 * | 5/2002 | Abraham | 370/282 |
| 6,407,987 B1 * | 6/2002 | Abraham | 370/295 |
| 6,633,228 B1 * | 10/2003 | Reitter | 375/260 |
| 6,686,832 B2 * | 2/2004 | Abraham | 370/203 |
| 6,809,633 B2 * | 10/2004 | Cern | 375/258 |
| 6,844,810 B2 * | 1/2005 | Cern | 375/258 |
| 6,922,135 B2 * | 7/2005 | Abraham | 340/12.38 |
| 6,958,680 B2 * | 10/2005 | Kline | H04B 3/54 |
| | | | 370/478 |
| 6,975,843 B2 * | 12/2005 | Simonsen | 455/126 |
| 6,980,091 B2 * | 12/2005 | White, II | H04B 3/56 |
| | | | 333/24 R |
| 6,985,715 B2 | 1/2006 | Lee | |
| 7,019,611 B2 * | 3/2006 | Kaku et al. | 336/178 |
| 7,042,351 B2 | 5/2006 | Kline | |
| 7,053,756 B2 | 5/2006 | Mollenkopf et al. | |
| 7,075,414 B2 | 7/2006 | Giannini et al. | |
| 7,170,367 B2 * | 1/2007 | Cern | 333/24 R |
| 7,173,938 B1 * | 2/2007 | Davidow | H04B 3/542 |
| | | | 370/401 |
| 7,276,814 B2 * | 10/2007 | Pozzuoli et al. | 307/77 |
| 7,333,003 B1 * | 2/2008 | Landry et al. | 375/258 |
| 7,391,317 B2 | 6/2008 | Abraham et al. | |
| 7,443,054 B2 * | 10/2008 | Pozzuoli et al. | 307/77 |
| 7,466,225 B2 * | 12/2008 | White et al. | 340/538 |
| 7,602,220 B1 | 10/2009 | Bofill-Petit | |
| 7,773,361 B2 * | 8/2010 | Davidow | 361/118 |
| 7,808,985 B2 | 10/2010 | Romero | |
| 7,853,237 B2 * | 12/2010 | Tokunaga | 455/402 |
| 7,860,146 B2 | 12/2010 | Molina | |
| 7,899,436 B2 | 3/2011 | Riveiro | |
| 2002/0154000 A1 | 10/2002 | Kline | |
| 2003/0016123 A1 | 1/2003 | Tager et al. | |
| 2003/0122473 A1 | 7/2003 | Manis et al. | |
| 2003/0129978 A1 | 7/2003 | Akiyama et al. | |
| 2003/0169155 A1 | 9/2003 | Mollenkopf et al. | |
| 2003/0224728 A1 | 12/2003 | Heinonen et al. | |
| 2004/0047427 A1 | 3/2004 | Dostert et al. | |
| 2004/0056734 A1 * | 3/2004 | Davidow | H04B 3/542 |
| | | | 333/100 |
| 2004/0107588 A1 | 6/2004 | Pu | |
| 2004/0113756 A1 | 6/2004 | Mollenkopf | |
| 2004/0113757 A1 | 6/2004 | White, II et al. | |
| 2004/0174851 A1 | 9/2004 | Zalitzky et al. | |
| 2004/0246107 A1 | 12/2004 | Kline | |
| 2004/0263282 A1 * | 12/2004 | Kaku et al. | 333/119 |
| 2005/0089061 A1 | 4/2005 | Logvinov et al. | |
| 2005/0141473 A1 | 6/2005 | Lim et al. | |
| 2005/0231036 A1 * | 10/2005 | No et al. | 307/1 |
| 2006/0038662 A1 | 2/2006 | White, II et al. | |
| 2006/0097574 A1 | 5/2006 | Gidge et al. | |
| 2006/0120399 A1 | 6/2006 | Claret et al. | |
| 2006/0126617 A1 | 6/2006 | Cregg et al. | |
| 2006/0269001 A1 * | 11/2006 | Dawson et al. | 375/257 |
| 2007/0076666 A1 | 4/2007 | Riveiro | |
| 2007/0149258 A1 * | 6/2007 | Tokunaga | 455/574 |
| 2007/0222637 A1 * | 9/2007 | Davidow | H04B 3/542 |
| | | | 340/870.02 |
| 2007/0229231 A1 | 10/2007 | Hurwitz | |
| 2008/0043992 A1 | 2/2008 | Hurwitz | |
| 2008/0107242 A1 * | 5/2008 | Ichihara et al. | 379/1.03 |
| 2008/0130640 A1 | 6/2008 | Hurwitz | |
| 2008/0159358 A1 | 7/2008 | Ruiz | |
| 2008/0304577 A1 * | 12/2008 | Koga et al. | 375/257 |
| 2009/0232286 A1 | 9/2009 | Hurwitz | |
| 2010/0246648 A1 * | 9/2010 | Rocamora et al. | 375/222 |

FOREIGN PATENT DOCUMENTS

| | | |
|---|---|---|
| EP | 1388954 A2 | 2/2004 |
| EP | 1531568 A1 | 5/2005 |
| EP | 1548974 A2 | 6/2005 |
| EP | 1432138 B1 | 9/2005 |
| JP | 2008227837 A * | 9/2008 |
| WO | 0195518 A2 | 12/2001 |
| WO | 03015291 A2 | 2/2003 |
| WO | 03077443 A1 | 9/2003 |
| WO | 03092212 A1 | 11/2003 |
| WO | 2004100392 A1 | 11/2004 |
| WO | 2005039070 A2 | 4/2005 |
| WO | 2006017743 A2 | 2/2006 |
| WO | 2006074174 A1 | 7/2006 |

OTHER PUBLICATIONS

Gardner, S., et al., HomePlug Standard Brings Networking to the Home, CSD, Dec. 2000.

UPA—Universal Powerline Association, Frequently Asked Questions, date unknown.

Powerstream Technology Background, Adaptive Networks, Inc., 2002.

Stelts, Michael, CEPCA Standard Summary, 2006.

Digital Home Statndard, Universal Powerline Association (UPA), 2005.

Powerline Communications Systems-Access/In-home & In-home/In-home Coexistence Mechanism-General Specifications, Universal Powerline Association (UPA), Jun. 27, 2005.

Opera Technology Specification—Part 1, Open PLC European Research Alliance (OPERA), Jan. 31, 2006.

Opera System Specification—Part 2, Open PLC European Research Alliance (OPERA), Jan. 31, 2006.

HomePlug 1.0 Technology White Paper, HomePlug Powerline Alliance.

HomePlug AV White Paper, HomePlug Powerline Alliance, 2005.

Juttner, A., et al., Tree Based Broadcast in Ad Hoc Networks, Sep. 9, 2004, pp. 1-21, Errisson Research, Traffic Analysis and Network Performance Laboratory, Budapest, Hungary.

Kouvatsos, D., et al., Broadcasting Methods in Ad Hoc Networks: An Overview, Proceeding of the 3rd International Working conference on Performance Modelling and Evaluation of Heterogeneous Networks, Jul. 20, 2005, pp. 1-14.

* cited by examiner

DUAL TRANSFORMER COMMUNICATION INTERFACE

CROSS-REFERENCE TO RELATED APPLICATIONS

This application is related to U.S. patent application Ser. No. 12/075,888 filed Mar. 14, 2008 and entitled "Coupling Signal Processing Circuitry with a Wireline Communications Medium"; U.S. patent application Ser. No. 11/467,141 filed Aug. 24, 2006 and entitled "Multi-Wideband Communications over Power Lines"; U.S. patent application Ser. No. 11/1536,539 filed Sep. 28, 2006 and entitled "Multi-Wideband Communications over Power Lines"; U.S. patent application Ser. No. 11/1752,887 filed May 23, 2007 and entitled "Multi-Wideband Communications over Multiple Mediums"; U.S. patent application Ser. No. 11/752,865 filed May 23, 2007 and entitled "Multi-Wideband Communications over Multiple Mediums within a Network"; U.S. patent application Ser. No. 11/493,292 filed Jul. 25, 2006 and entitled "Feedback Impedance Control for Driving a Signal"; and U.S. patent application Ser. No. 11/855,081 filed Sep. 13, 2007 and entitled "Improved Wireline Transmission Circuit." The above patent applications are hereby incorporated herein in their entirety, which applications are commonly owned by the assignee of the present application. The subject matter of the commonly owned applications is related to the present application and is, incorporated by reference into the present application for all purposes.

BACKGROUND

Field of the Invention

The invention is in the field of communications over power lines or the like.

Related Art

Communication of data via power lines includes the coupling of data encoded signals into and from the power lines. For various reasons, these data encoded signals are preferably on the order of 15 Volts (peak-to-peak) to achieve the maximum allowable Power Spectral Density (PSD) over the spectrum allowed by various standards and regulations. One approach to generating these 15 Volt signals includes using an amplifier to increase the signal from say approximately 2 Volts (peak-to-peak) to 15. This amplifier adds to the cost of a system because it requires an additional high voltage power supply sufficient to achieve the 15 Volts and is typically implemented on a separate silicon device, relative to the circuits used to generate the original signals, because of its higher voltage requirements. The 15 Volt signals are then coupled to a power line via a single low ratio isolation transformer.

In another approach, signals on the order of 15 Volts can be generated from signals on the order of 4 Volts peak-peak by using a single transformer with a high (e.g., 1:4) ratio of primary to secondary coils. This approach has the advantage that this same transformer may be used as an isolation transformer to couple the signals into the power line. This can result in significant savings. However, this approach presents several problems. For example, for a 1:4 (P:S) transformer the impedance seen before the transformer is $\frac{1}{16}^{th}$ of the impedance seen after the transformer. This may result in impedance before the transformer that is difficult to drive. This low impedance also places requirements on any signal conditioning components between the signal source and the transformer. These requirements result in a greater component cost. Further, quality factors and parasitics associated with the windings and core of the transformer can limit the width of the frequency range over which the transformer will perform without loss in the resulting signal. As a result, if a wide frequency range is required with relatively high injected power capability, then very expensive or even impossible transformers may be needed.

Signal conditioning components are sometimes used to shape the frequency response of the driving signal, or to combine it with another signal in a different frequency band. It is important for optimum performance that these signal conditioning components are approximately the same impedance as the impedances driving and being driven by them to achieve maximum power efficiency. This can be difficult. There are many other signal conditioning functions, such as surge protection, impedance matching, switching, that are not just passive but active, which require low loss components, this is more difficult to achieve if a low impedance is present due to a single high ratio transformer.

SUMMARY

Various embodiments include the use of two transformers in series, each having a winding ratio greater than one, to convert a lower voltage signal to higher voltages. These two transformers are disposed in a transmission signal path between a signal source and a power line connector. One or both of the two transformers are optionally included in both signal transmit and signal receive pathways.

Some embodiments of the invention enable different ratios of voltage step up and voltage step down for the transmit and receive pathways, respectively. This may allow for better control of signal to noise ratios and/or a greater dynamic range for each pathway. For example, some embodiments of the invention enable signal conditioning circuitry anywhere along the transmit pathway, to protect the circuitry from overload conditions and/or to provide frequency shaping to the transmitted signal. Further, by using two transformer primary to secondary ratios on the order of ~1:2 (Primary:Secondary), an approximately 4.4V differential output peak-peak signal from 3.3V powered CMOS circuitry may be increased to approximately 15 Volts peak-peak signal, while allowing for some (~15%) losses in the signal conditioning circuitry in the transmit pathway. These 15V signals are then coupled to a power line for transmission to other devices. By using more than one transformer with winding ratios on the order of 1:2 instead of a single transformer with higher winding ratio, less expensive and higher bandwidth devices may be used in the transmission signal path, and the losses in the signal conditioning circuitry may be better controlled with lower cost components.

Various embodiments of the invention include a system comprising: a first signal source configured to generate a first data encoded signal; a first transformer configured to receive the first data encoded signal at a primary winding, and having a primary to secondary winding ratio that is greater than one; and a second transformer in series with the first transformer, configured to receive an output of the first transformer at a primary winding of the second transformer, configured to provide an output signal including the first data to an alternating current power line, and having a primary to secondary winding that is greater than one.

Various embodiments of the invention include a system comprising: a transmit path between a signal source and a power line, the transmit path comprising at least a first transformer and a second transformer in series; and a receive path between the power line and a signal receiver, the receive path comprising at least the second transformer but not the first transformer, the signal source and signal receiver being included in the same communication interface.

Various embodiments of the invention include a method of communicating a signal, the method comprising: generating a first digitally encoded signal; passing the first digitally encoded signal through a first transformer; passing the first digitally encoded signal through a second transformer in series with the first transformer; and coupling the first digitally encoded signal into an AC power line.

Various embodiments of the invention include a method of communicating a signal, the method comprising: receiving a first digitally encoded signal from an AC power line; passing the first digitally encoded signal through a first transformer; conditioning the first digitally encoded signal to separate required frequencies of the first digital encoding signal from other frequencies; optionally passing the first digitally encoded signal through a second transformer in series with the first transformer; and decoding the first digitally encoded signal.

DETAILED DESCRIPTION

Figure 1:
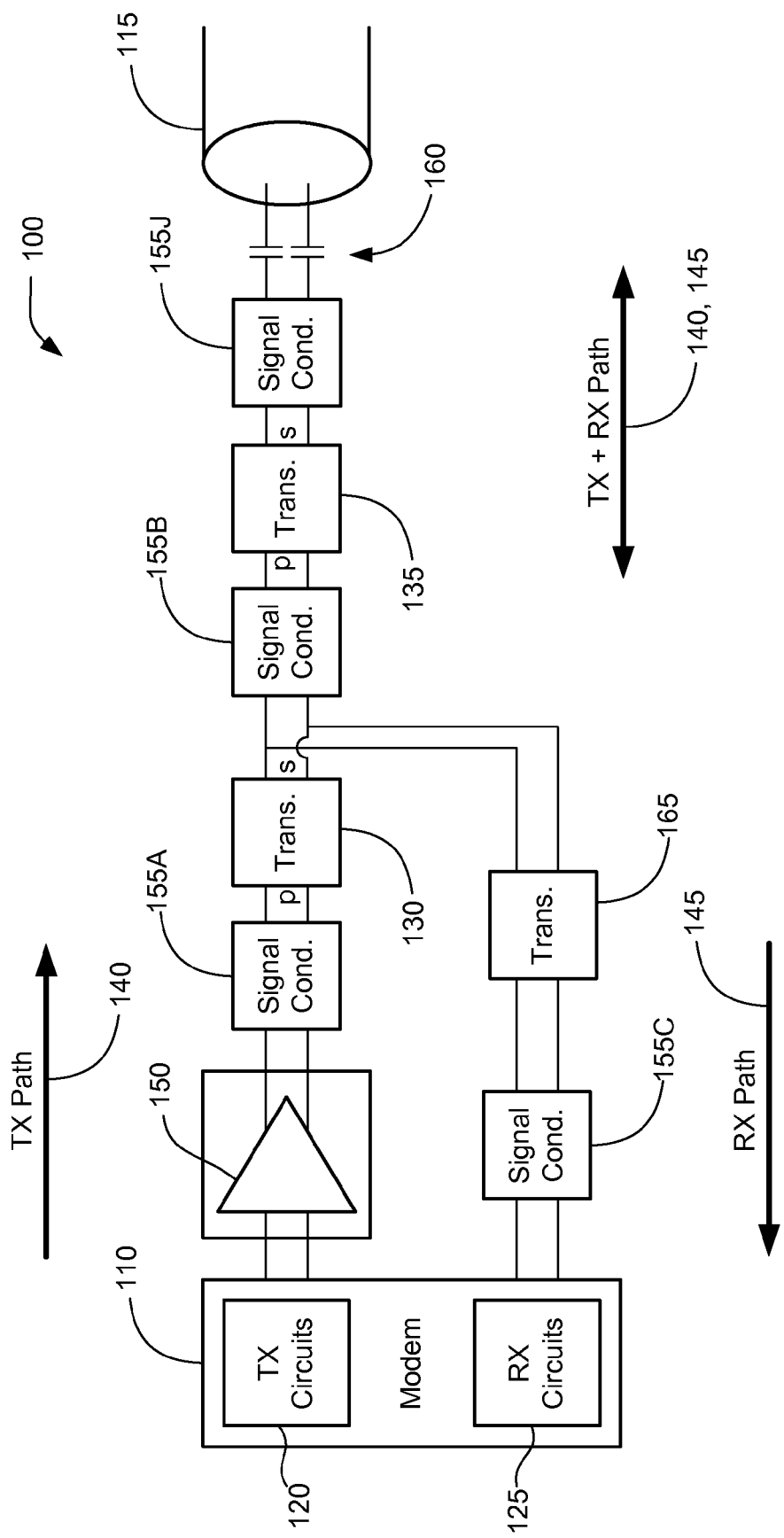
FIG. 1 illustrates a communication interface comprising two transformers in series, according to various embodiments of the invention.

In power line communications digitally encoded signals are passed through an AC (alternating current) power line. The same power line can be used to both power an electronic system and to communicate between the electronic system and other devices. The digitally encoded signals may include video data, audio data, TCP/IP data, Ethernet data, or any other data type. The digitally encoded signals are transmitted from and received by low voltage circuits that have both digital and analog sections. These circuits are typically developed on small geometry CMOS, BiCMOS, or similar technologies and have a limited range of allowable supply voltages for the digital and analog sections of the technology. For example, digital sections of a communication system may be powered by 0.8V, 0.9V, 1V, 1.2V, 1.8V, 2.5V, 2.8V, 3.3V or 5V power supplies, amongst others. Analog and input/output (IO) sections of the communication system may be powered using different voltages. For example the digital sections may operate from a 1V power supply while the analog circuits may operate from a 1.2V, 1.8V, 2.5V, 2.8V, 3.3V or 5V power supply, amongst others.

Some examples discussed herein assume that the output of the low voltage circuits (e.g., a signal source) is based on CMOS circuits and thus the signal is driven from a power supply (VDD) in the range of 1.8V to 5V, and, thus, in these examples it is only practically possible to output directly a differential linear signal considerably less than 2*VDD peak-to-peak. (E.g., from a 3.3V supply it may only be possible to design circuitry that can create a linear signal with approximately 4.4V peak-to-peak.) However it is to be understood that other technologies, with other power supply voltages, and other linear output signal voltages may be included in the low voltage circuits in alternative embodiments.

The digitally encoded output of the low voltage circuits is passed through a transmit path that includes coupling circuitry prior to introduction into a power line. This coupling circuitry comprises a plurality of transformers in series and configured to increase the voltage of these signals. For example, a 4.4V signal, generated using a signal source, can be ideally stepped up to 17.6 Volts using two transformers each having a winding ratio of 1:2. The combined impact of these transformers is to increase the voltage by 2×2=4 times. In various embodiments, the voltage of the signals introduced into the power line are ~4 volts, ~6 volts, ~8 volts, ~10 volts, ~12 volts, ~14 volts, ~16 volts, ~18 volts, ~20 volts, or between any combinations of these voltages. The maximum peak-to-peak voltage of the digitally encoded signal injected into the power line may be a function of industry standards, the regulatory requirements, a specific application, the implementation, and/or the like. For example, the industry standard Homeplug AV 1.1 allows a maximum Power Spectral Density (PSD) of −50 dBm/Hz in the band between 1.8 MHz and 30 MHz. In a given country regulatory bodies may only allow a lower injected power, a customer may request an even lower PSD for their own application reasons, such as power consumption or other product considerations. The final peak to-peak voltage may depend on the implementation of the modem. For example, the Peak-to-Average ratio of an OFDM (orthogonal frequency division multiplexing) symbol may be restricted by clipping, to effect a valid range of equivalent peak-peak signals on the line.

Digitally encoded signals received from the power line are passed through a receive path. The receive path may include one or both of the transformers that are included in the transmit path. For example, in some embodiments, the receive path includes the same transformers as the transmit path. In these embodiments, the peak-to-peak voltages of incoming signals are optionally reduced by the same ratio as the transmitted signals are increased. For example, if the voltages of the transmitted signals are increased by four times then the received signals may be reduced by four times. In other embodiments the receive path includes one but not both of the transformers included in the transmit path. For example, if the transmit path includes two transformers with winding ratios of 1:2 and the receive path includes the second but not the first of these two transformers, then the peak-to-peak voltage of the received signals are reduced by approximately a factor of 2. In some embodiments a transformer included in both the transmit path and the receive path is a multi-tap transformer and, thus, the winding ratio experienced along the transmit and receive paths at this transformer may be different.

FIG. 1 illustrates a Communication Interface 100 comprising two transformers in series, according to various embodiments of the invention. Communication Interface 100 is disposed between a Power Line Modem 110 and a Power Line 115 and is configured to couple digitally encoded signals between these devices. Power Line Modem 110 typically comprises TX (transmit) Circuits 120 and RX (receive) Circuits 125. TX Circuits 120 are an example of a signal source. In some embodiments, TX Circuits 120 and RX Circuits 125 include CMOS circuits configured to generate and receive signals using a 3.3V DC power supply (VDD). In some embodiments the TX Circuits 120 generate a 2V peak-to-peak differential signal, in some embodiments the TX Circuits 120 generate a smaller or a larger signal according to their abilities.

Communication Interface 100 optionally further comprises a low voltage Line Driver 150. Line Driver 150 is typically a buffer, a transimpedance stage or a low gain (e.g. <4× or <2×) amplifier that is configured to supply sufficient voltage and current to propagate signals into other elements of Communication Interface 100. Line Driver 150 is optionally disposed on the same semiconductor substrate as TX Circuits 120. Line Driver 150 is optionally integrated into the TX Circuits 120. Line Driver 150 is optionally powered by the same supply voltage as TX Circuits 120. For example, both TX Circuits 120 and Line Driver 150 may be powered using the same 3.3V, 5V or the like. Power Line 115 is configured to convey power. For example, Power Line 115 may include a 110 to 240V AC signal at 50 to 60 Hz. Electrical power from Power Line 115 is optionally used to power Power Line Modem 110 using circuits not shown.

Communication Interface 100 includes at least a Transformer 130 and a Transformer 135. Transformer 130 is disposed within a TX (transmit) Path 140 but optionally not a RX (receive) Path 145. Transformer 135 is in series with Transformer 130 with respect to the TX Path 140, and is optionally also included in RX Path 145. Transformer 130 and Transformer 135 each have a primary to secondary winding ratio greater than one, e.g., less than or equal to 1:1.66 or 1:2 or 1:2.1. For example, in typical embodiments, Transformer 130 and Transformer 135 include winding ratios between approximately 1:1.5 and 1:4. In some embodiments, Transformer 130 and Transformer 135 include winding ratios between approximately 1:1.66 and 1:2.5. The winding ratios of Transformer 130 and Transformer 135 are optionally different. For example, in one embodiment Transformer 130 is characterized by a winding ratio of 1:2.25 while Transformer 135 is characterized by a winding ratio of 1:2. The winding ratios of Transformer 130 and Transformer 135 are optionally selected such that a signal generated by TX Circuits 120 is at least 4V peak-to-peak after passing through Transformer 135. For example, in various embodiments, the resulting output of Transformer 135 is between 4V and 6V, between 6V and 8V, between 8V and 10V, between 10V and 12V, between 12V and 14V, between 14V and 16V, between 16V and 18V, between 18V and 20V, or is configurable between 4V and 20V, peak-to-peak.

Communication Interface 100 optionally further includes one or more Signal Conditioners 155, individually labeled 155A . . . 155J, etc. Signal Conditioners 155 include active or passive filters or other signal modifying circuits. For example, in some embodiments, Signal Conditioner 155 comprises a frequency dependent filter configured to separate the power signal of Power Line 115 at 50-60 Hz from digitally encoded signals at higher frequencies.

In some embodiments, Signal Conditioners 155 are used to remove noise from the line that is below an operating band. In some embodiments, Signal Conditioners 155 are used to prevent unwanted out of band frequency signals in either the TX and/or RX pathways, such as those generated in the replica spectrum of a sampled system or those generated by some other signal source. For example, Signal Conditioners 155 may be configured to block signals associated with telephonic communication, cable television signals, digital subscriber line (DSL) communication, and/or the like. In some embodiments, Signal Conditioners 155 are configured to perform some protection task, such as current limiting or over-voltage protection. In some embodiments, Signal Conditioners 155 are used to impedance match the input to the output of other components to improve signal transfer and spectral response. In some embodiments, Signal Conditioners 155 are configured to separate signals in a high band from signals in a low band. Signal Conditioners 155 are optionally configured to achieve several of these functions.

Communication Interface 100 optionally further comprises one or more Coupling Capacitors 160 and other Signal Conditioner 155J on the AC mains side of the last Transformer 135. Signal Conditioner 155J can include the Coupling Capacitors 160 or be transposed with Coupling Capacitors 160 in various configurations to safely couple the signals onto the Power Line 115. Signal Conditioner 155J can be passive and/or active, and can provide filtering or protection functions amongst other functions. The final Transformer 135 is optionally configured to be of a voltage rating to provide secondary isolation from the AC mains. One of ordinary skill in the art will understand that there are various alternative configurations that may be used to couple Communication Interface 100 to Power Line 115.

Communication Interface 100 optionally further includes a Transformer 165 that is included in RX Path 145. Transformer 165 may include a winding ratio of one, a winding ratio greater than one, or a winding ratio less than one. The circuit configurations shown here are differential in nature, but it will be easily understood that any section in either or both of the RX or TX paths may be single-ended. Communication Interface 100 optionally includes one or more fuses, not shown.

While the TX Path 140 and the RX Path 145 are shown to separate between Transformer 130 and Signal Conditioner 155B in FIG. 1, these two signal paths may separate at other points within Communication Interface 100 in alternative embodiments. For example, between Line Driver 150 and Signal Conditioner 155A, between Signal Conditioner 155A and Transformer 130, between Signal Conditioner 155B and Transformer 135, between Transformer 135 and Signal Conditioner 155J, or between Signal Conditioner 155J and Coupling Capacitors 160. As shown elsewhere herein the separation point may include a transformer or a signal conditioner.

Figure 2:
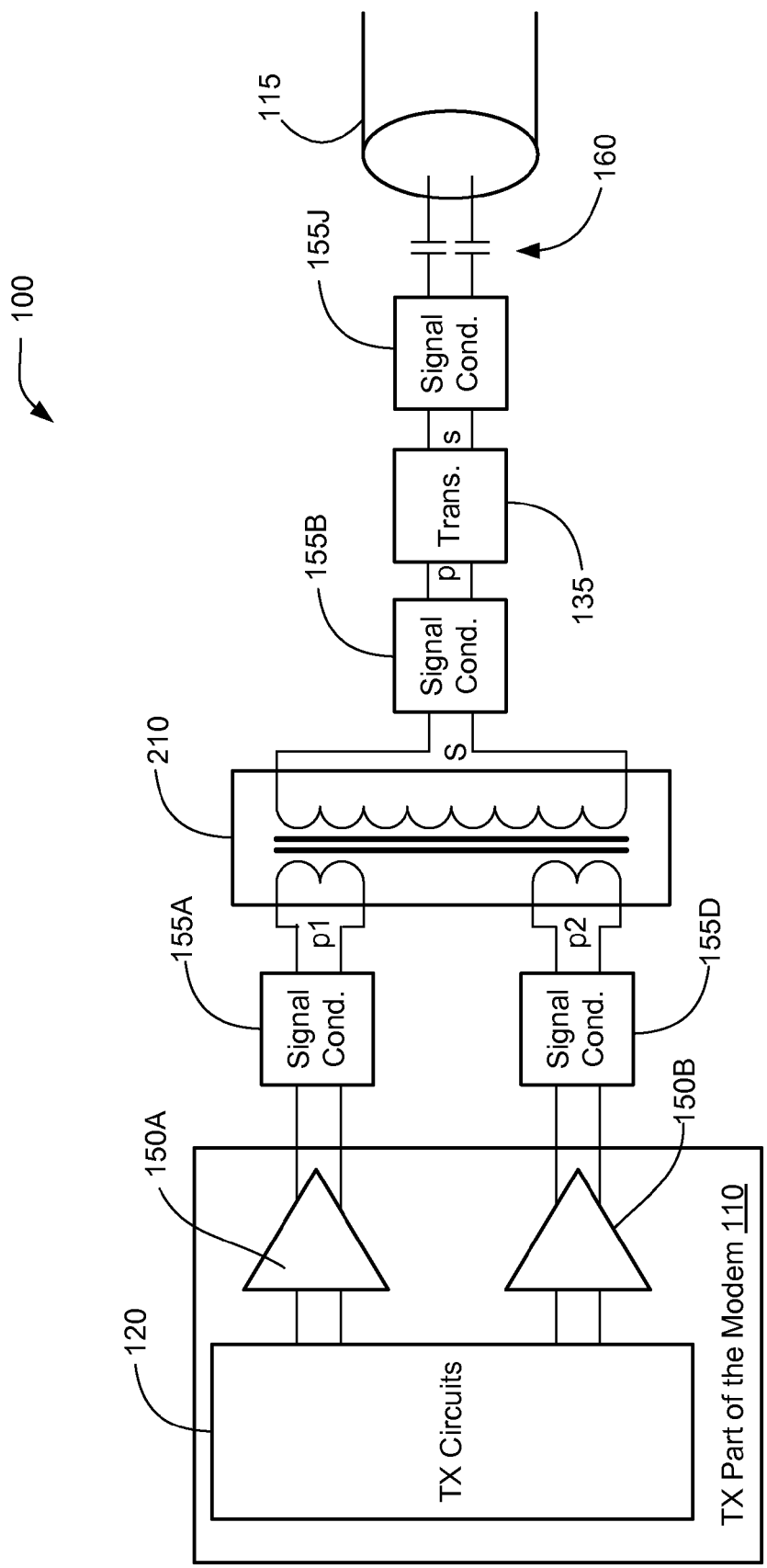
FIG. 2 illustrates a TX Path of a dual-line-driver communication interface comprising two transformers in series, according to various embodiments of the invention.

FIG. 2 illustrates the TX Path 140 of a multiple output single band communication interface implemented with a split TX pathway, comprising two transformers in series, according to various embodiments of the invention. In these embodiments, TX Path 140 includes a Multi-Tap Transformer 210, optional Signal Conditioner 155A, optional Signal Conditioner 155D, and one, two or more optional Line Driver 150, individually labeled 150A . . . 150B, etc. Each Line Driver 150 is configured to drive signals responsive to circuitry in the TX Circuits 120. In some embodiments, the signals generated by Line Drivers 150 are similar and result in an additive effect within Multi-Tap Transformer 210, in order to further increase the injected power. These signals transmitted at the same frequency at the same time and to be combined are considered additive signals. In these embodiments, Signal Conditioner 155A and Signal Conditioner 155D are optionally the same. Likewise Line Driver 150A and Line Driver 150B are optionally the same. In other embodiments, the signals generated by Line Drivers 150 are of different frequency, and Signal Conditioners 155A and 155D are configured to condition signals of different frequencies within the same transmission band and Line Drivers 150A and 150B may or may not be the same. For instance, in some embodiments, Line Driver 150A is configured to drive signals in a first frequency range of a communication band while Line Driver 150B is configured to drive signals in a second frequency range of the same communication band. For example, Line Driver 150A may be configured to drive signals between 2 and 12 MHz while Line Driver 150B is configured to drive signals between 12 and 30 MHz. As both Line Drivers 150A and 150B communicate complementary (e.g., interdependent) signals, the effective signal transmitted is effectively one interdependent signal between 2-30 MHz when the signal exits Multi-tap Transformer 210.

Multi-Tap Transformer 210 may have the same winding ratios between each of the primary coils and the secondary coil, or may have different winding ratios. For example, in some embodiments, one of the primary coils may have an effective winding ratio of 1:2 while the other has an effective winding ratio of 1:2.5. In some embodiments Multi-Tap Transformer 210 includes more than two primary taps and is configured to receive signals from more than 2 Line Drivers 150.

RX Path 145 is not shown in FIG. 2 for clarity, but optionally includes Transformer 135 but not Multi-Tap Transformer 210. RX Path 145 optionally includes an additional multi-tap transformer similar to Multi-Tap Transformer 210.

Figure 3:
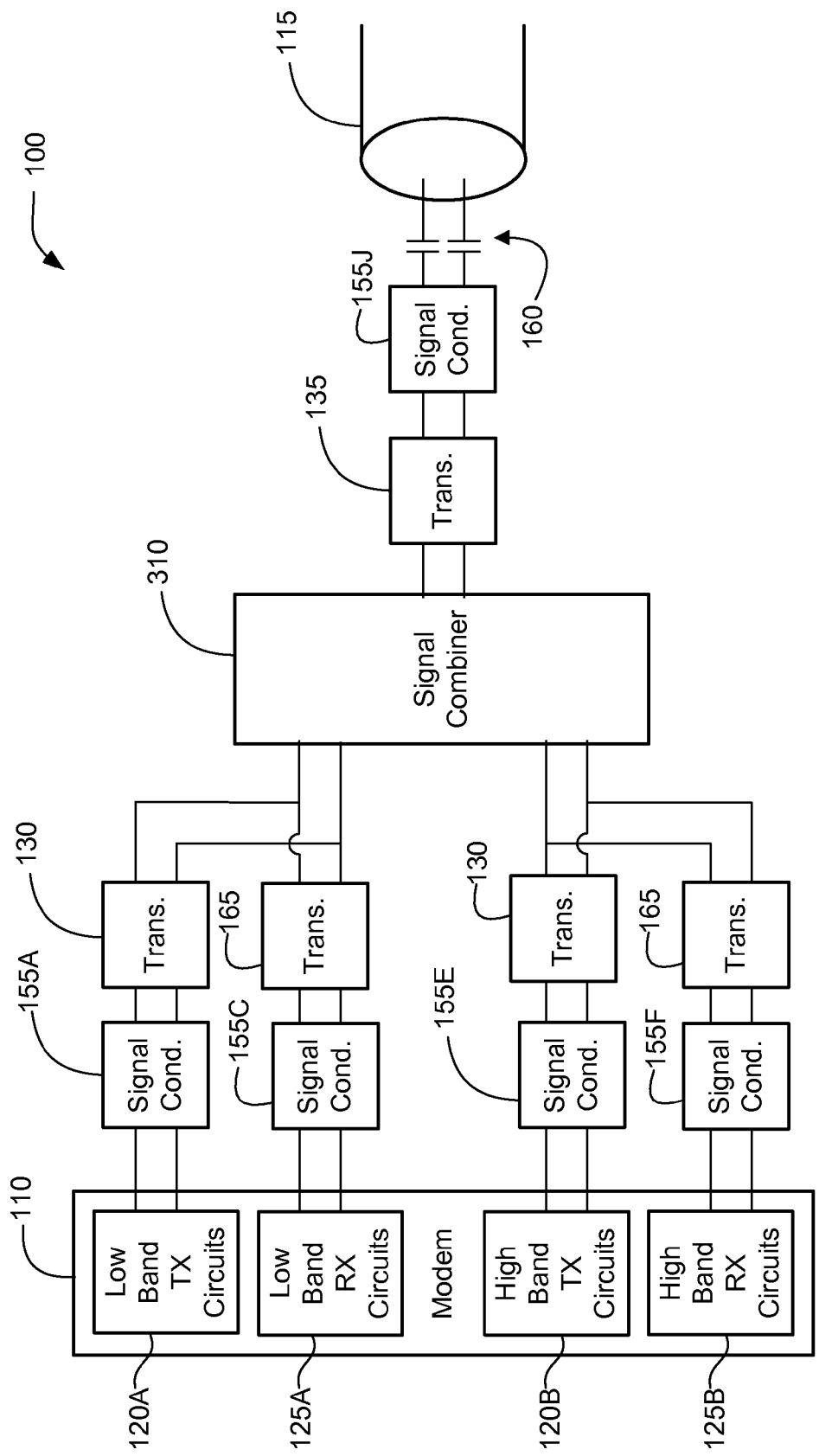
FIG. 3 illustrates alternative embodiments of a communication interface including separate "high" and "low" band channels, according to various embodiments of the invention.

FIG. 3 illustrates alternative embodiments of Communication Interface 100 including separate "high" and "low" band channels in both TX Circuits 120 and RX Circuits 125. The terms high band and low band are used here to indicate the relative frequencies of each band and not their absolute frequency ranges. The high and low band channels may include any of the frequency ranges and combinations taught in the U.S. Patent applications cited herein. Typically each of these bands will include a distinct (although optionally overlapping) set of frequencies. In FIG. 3 Line Drivers 150 are not shown for clarity.

In the embodiments illustrated by FIG. 3, TX Circuits 120 are divided into Low Band TX Circuits 120A and High Band TX Circuits 120B. Low Band TX Circuits 120A are configured to transmit digitally encoded signals in the low band and High Band TX Circuits 120B are configured to transmit digitally encoded signals in the high band. The transmitted signals are optionally passed through a line driver (not shown), signal conditioner 155A and/or Transformer 130 before being received by a Signal Combiner 310.

Likewise, RX Circuits 125 are divided into High Band RX Circuits 125B and Low Band RX Circuits 125A, configured to receive digitally encoded signals in the high and low bands respectively. The received signals are optionally received through Signal Conditioner 155C, a Signal Conditioner 155E and/or Transformer 165.

Signal Combiner 310 is configured to combine and separate the high band and low band signals. For example Signal Combiner 310 combines signals transmitted by Low Band TX Circuits 120A and by High Band TX Circuits 120B. Signal Combiner 310 may include, for example, a multiplexer, a multi-tap transformer, a combination of high and low pass filters, a combination of band-pass and notch filters, a diplexer configured, or the like. In some embodiments Signal Combiner 310 is combined with Transformer 135. Another instance of Signal Conditioner 155 is optionally disposed between Signal Combiner 310 and Transformer 135. Separate instances of Signal Combiner 310 are optionally used for the low band and high band TX and RX signals. Transformers 130 used to transform the low band and high band signals optionally have different characteristics such as winding ratios, frequency profiles, impedance, and/or the like, respectively. Likewise, optional Transformers 165 used to transform the low band and high band signals optionally have different characteristics such as winding ratios, frequency profiles, impedance, and/or the like, respectively.

Figure 4:
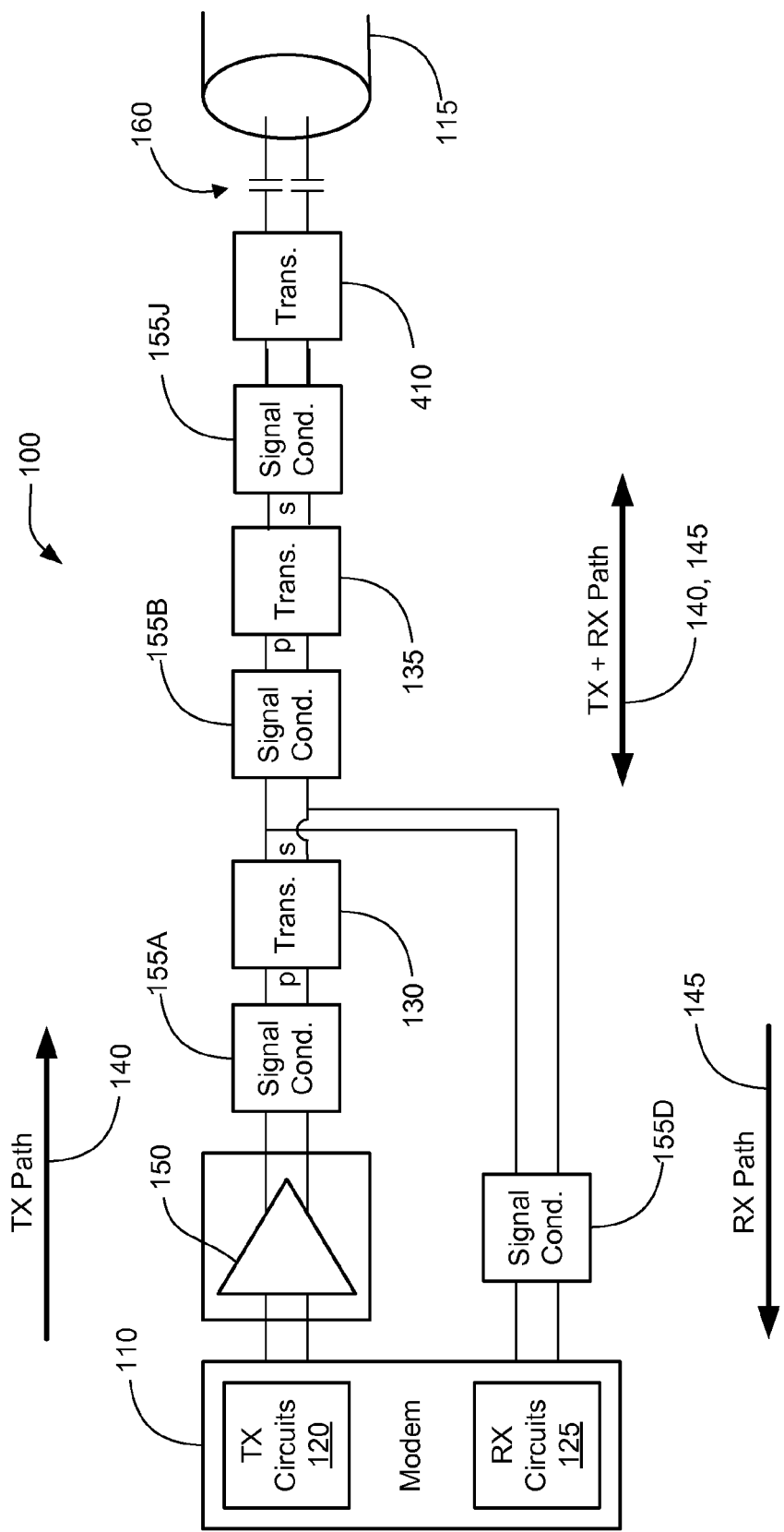
FIG. 4 illustrates alternative embodiments of a communication interface including a separate isolation transformer, according to various embodiments of the invention.

FIG. 4 illustrates alternative embodiments of Communication Interface 100 including a separate Isolation Transformer 410. Isolation Transformer 410 is configured to isolate relatively large voltages found on Power Line 115 from other components of Communication Interface 100. Isolation Transformer 410 may have a winding ratio less than, equal to, or greater than one. Signal Conditioner 155J is optionally disposed between Isolation Transformer 410 and Transformer 135. For example, Signal Conditioner 155J may be configured to block signals around 50-60 Hz and, thus, reduce the magnitude of voltages experienced by Transformer 135. Isolation Transformer 410 is optionally included in the other embodiments of Communication Interface 100 discussed herein.

Figure 5:
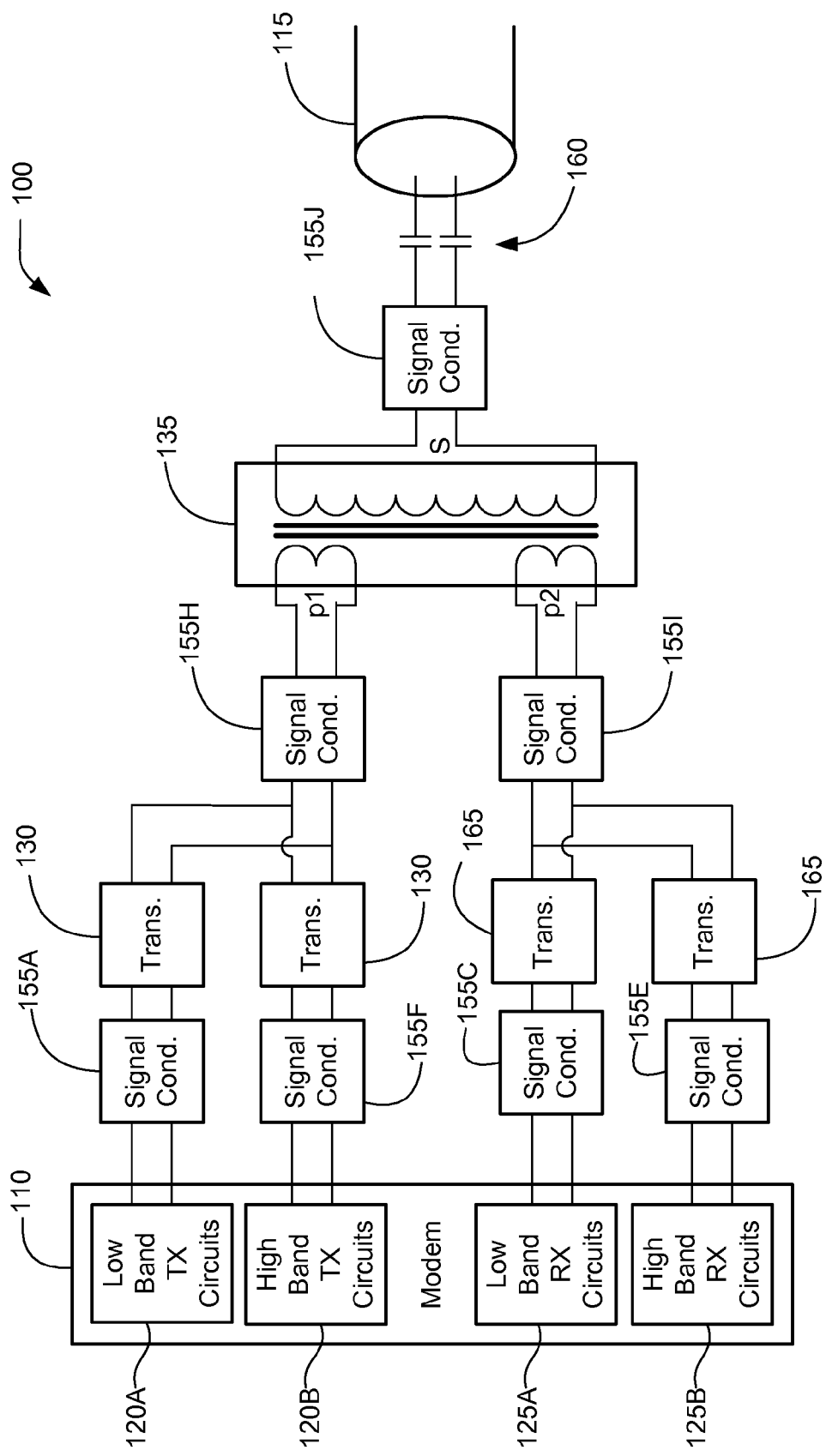
FIG. 5 illustrates alternative embodiments of a communication interface including separate "high" and "low" band channels wherein the channels are combined in a multi-tap transformer, according to various embodiments of the invention.

FIG. 5 illustrates alternative embodiments of Communication Interface 100 wherein Transformer 135 is a multi-tap transformer. In these embodiments, transmitted signals are coupled through a First Primary Winding (P1) and received signals are coupled through a Second Primary Winding (P2). All of these signals are coupled through a Secondary Winding (S). The ratio of P1:S may be greater than, the same as, or less than the ratio P2:S. For example, in some embodiments, P1:S is 1:4 while P2:S is 2:4, approximately. P2:S may be two or more times greater than P1:S. As in the embodiments illustrated by FIG. 3, additional elements, such as Transformer 165, are optional in the embodiments illustrated by FIG. 5.

Using the embodiments of Communication Interface 100 illustrated in FIG. 5 it is possible that a signal generated using Low Band TX Circuits 120A is increased in magnitude by Transformer 130 and the winding ratio P1:S before being coupled into Power Line 115. Likewise, a low band signal received from Power Line 115 may be reduced by the winding ratio P2:S and the optional Transformer 165 before being received at Low Band RX Circuits 125A. Embodiments of Signal Combiner 310 (not shown) are optionally used to combine/separate low and high band signals in the embodiments illustrated by FIG. 5.

Figure 6:
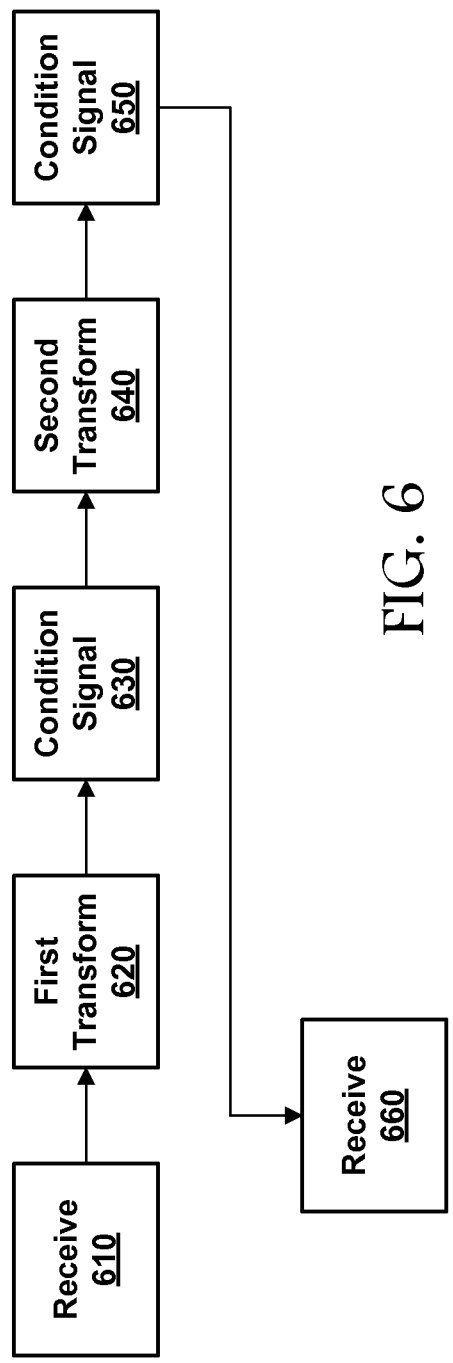
FIG. 6 illustrates methods of receiving a digitally encoded signal, according to various embodiments of the invention.

FIG. 6 illustrates methods of receiving a digitally encoded signal, according to various embodiments of the invention. These methods are discussed generally in relation to the embodiments of Communication Interface 100 illustrated by FIG. 1. However, it will be apparent to those skilled in the art that the methods illustrated by FIG. 6 can be adapted to other embodiments of Communication Interface 100 illustrated herein. These adaptations will include steps relating to passing signals through one or more of the components illustrated in, for example, FIGS. 2-5.

In a Receive Step 610, a digitally encoded signal is received from Power Line 115. This signal may be received from another device as part of a network communication. This other device may include an embodiment of Communication Interface 100. The received signal may include network communication protocols such as telephone exchange, TCP/IP or Ethernet protocols.

In a First Transform Step 620, the digitally encoded signal is transformed to a lower peak-to-peak voltage using Transformer 135.

In an optional Condition Signal Step 630, the received signal is conditioned using Signal Conditioner 155B. For example, Condition Signal Step 630 may include separating signals at the frequency at which power is transmitted through Power Line 115 from signals that include digitally encoded data at different frequencies.

In an optional Second Transform Step 640, the received and optionally conditioned signal is transformed again using Transformer 165. In various embodiments, this transformation results in a signal having a lower peak-to-peak voltage, approximately the same peak-to-peak voltage, or a greater peak-to-peak voltage.

In an optional Condition Signal Step 650, the signal is conditioned using Signal Conditioner 155C. In some embodiments, this conditioning is configured to separate signals in different frequency bands.

In a Receive Step 660, the signal is received by RX Circuits 125. RX Circuits 125 may be used to decode the digitally encoded information within the received signals. For example, RX Circuits may generate digital data representative of the encoded information using an analog to digital converter.

Figure 7:
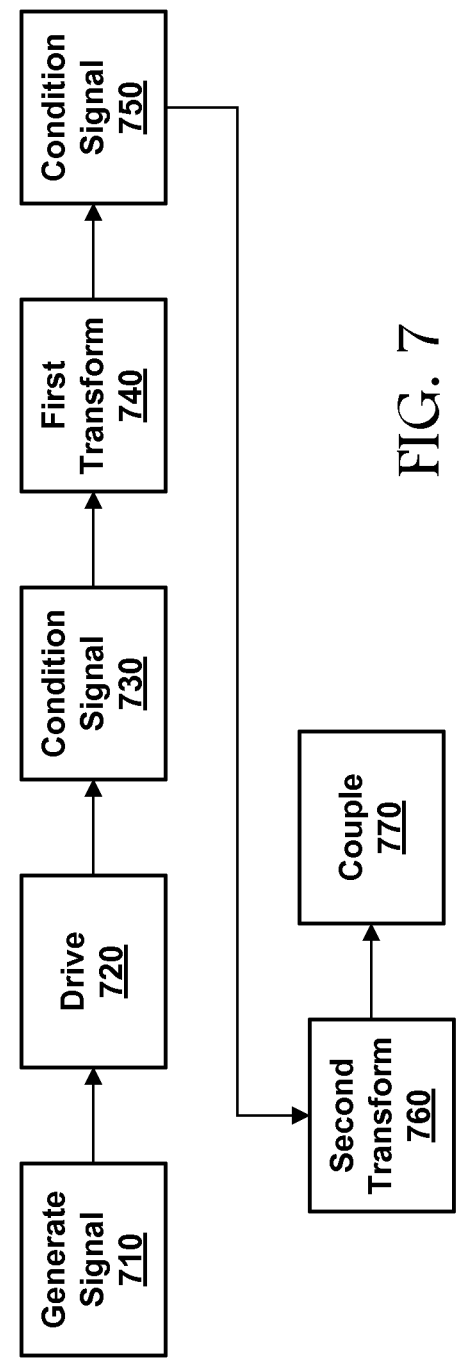
FIG. 7 illustrates methods of transmitting a digitally encoded signal, according to various embodiments of the invention

FIG. 7 illustrates methods of transmitting a digitally encoded signal, according to various embodiments of the invention. These methods are discussed generally in relation to the embodiments of Communication Interface 100 illustrated by FIG. 1. However, it will be apparent to those skilled in the art that the methods illustrated by FIG. 7 can be adapted to other embodiments of Communication Interface 100 illustrated herein. These adaptations will include steps relating to passing signals through one or more of the components illustrated in, for example, FIGS. 2-5.

In a Generate Signal Step 710, TX Circuits 120 are used to generate a signal including digitally encoded information. In some embodiments, this information is received from a computing device using Communication Interface 100 to communicate with other devices via Power Line 115. The generated signal may include network communication protocols such as telephone exchange, TCP/IP or Ethernet protocols.

In an optional Drive Step 720, Line Driver 150 is used to provide the signal at an appropriate voltage, current, impedance and/or the like. Drive Step 720 optionally includes amplifying the signal generated by TX Circuits 120.

In an optional Condition Signal Step 730, Signal Conditioner 155A is used to condition the signal from Line Driver 150.

In a First Transform Step 740, the signal is transformed using Transformer 130. This transformation includes increasing the peak-to-peak voltage of the signal.

In an optional Condition Signal Step 750, the signal transformed using Transformer 130 is conditioned using Signal Conditioner 155B.

In a Second Transform Step 760, the signal is transformed for a second time using Transformer 135. This step includes further increasing the peak-to-peak voltage of the signal. Examples of the resulting peak-to-peak voltages are provided elsewhere herein.

In a Couple Step 770, the signal is coupled into Power Line 115 using Coupling Capacitors 160.

The methods illustrated by FIG. 7 are optionally performed in response to receiving a signal using the methods illustrated by FIG. 6. For example, a computing device (not shown) may receive data from Power Line 115 using Communication Interface 100 and in response to this data send different data to another computing device using Communication Interface 100 and Power Line 115. The received and transmitted signals are optionally in different frequency bands. Further, steps of separating or combining signals in different frequency ranges using embodiments of Signal Conditioner 155 and/or Signal Combiner 310 may occur in the embodiments illustrated by FIGS. 6 and 7.

Several embodiments are specifically illustrated and/or described herein. However, it will be appreciated that modifications and variations are covered by the above teachings and within the scope of the appended claims without departing from the spirit and intended scope thereof. For example, while communication through power lines has been discussed herein for the purposes of example, the invention may be adapted for communication through telephone lines, and cable systems as disclosed in the U.S. Patent Applications cited herein. Communication Interface 100 may be adapted for communication through these media or any combination of telephone lines, cable systems, and/or power lines. Further, the examples provided herein may include additional circuits components configured for shielding, electric discharge protection, performing logic operations, supplying power, making physical connections to communication media, and/or the like.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The invention claimed is:

1. An alternating current power line communication interface device comprising:
communication interface circuitry including:
a first signal source configured to generate a first data encoded signal;
first signal conditioning circuitry connected to the first signal source for modifying the first data encoded signal;
a first transformer connected to the first signal conditioning circuitry and configured to receive and transform an output from the first signal conditioning circuitry at a primary winding, the primary winding having a secondary to primary winding ratio that is greater than one;
second signal conditioning circuitry connected to the first transformer for modifying an output from the first transformer; a second transformer connected in series with the second signal conditioning circuitry to receive and transform an output from the second signal conditioning circuitry at a primary winding of the second transformer, the second transformer including a secondary winding electromagnetically coupled to the primary winding to provide an output signal, the second transformer having a secondary-to-primary winding ratio that is greater than one; the first transformer and the second transformer configured to change a voltage of the first data encoded signal in a stepwise fashion; and signal coupling circuitry coupled to the secondary winding of the second transformer, the signal coupling circuitry configured to couple the output signal to the alternating current power line.

2. The communication interface device of claim 1 wherein at least one of the first or second signal conditioning circuitry includes a filter connected to receive and configured to pass the first data encoded signal and to block a frequency at which power is conveyed through the alternating current power line.

3. The communication interface device of claim 1 wherein at least one of the first or second signal conditioning circuitry includes a filter that is connected to receive and configured to pass the first data encoded signal and attenuate a frequency at which unwanted signals are conveyed.

4. The communication interface device of claim 1 further comprising an impedance of the first signal conditioning circuitry matched to the first transformer and an impedance of the second signal conditioning circuitry matched to the second transformer wherein the first signal conditioning circuitry is connected to electrically communicate with the first transformer and the second signal conditioning circuitry is connected to electrically communicate with the second transformer.

5. The communication interface device of claim 1, further including a signal receiving circuit configured to receive a second data encoded signal and to decode the second data encoded signal, wherein a signal path of the received second data encoded signal includes the alternating current power line and the second transformer but not the first transformer.

6. The communication interface device of claim 1 further including a signal receiving circuit connected to receive a second data encoded signal from the alternating current power line and to decode the second data encoded signal, wherein a signal path of the received second data encoded signal includes the second transformer and the first transformer.

7. The communication interface device of claim 1 further including a second signal source that generates, in a parallel signal path, a second data encoded signal within a frequency range that is different than a frequency range of the first data encoded signal, wherein a signal path of the second data encoded signal includes the second transformer but not the first transformer.

8. The communication interface device of claim 1, wherein at least part of the first data encoded signal is at frequency between 1.8 MHz and 30 MHz.

9. The communication interface device of claim 1, wherein the first transformer includes a primary to secondary winding ratio between approximately 1:1.5 and 1:3.

10. The communication interface device of claim 1, wherein the first signal source is configured to generate the first data encoded signal at a peak-to-peak voltage of between approximately 2 and 8 volts.

11. The communication interface device of claim 1, wherein the output of the first signal source comprises a CMOS (complementary metal oxide semiconductor) circuit and the output of the second transformer is at least 4 volts peak-to-peak.

12. The communication interface device of claim 1 further comprising a line driver powered by the same supply voltage as the first signal source, the line driver being configured to drive the first data encoded signal.

13. The communication interface device of claim 1, wherein the first signal source includes a plurality of line drivers that generate additive signals to increase the injected power of the first data encoded signal into the first transformer.

14. The communication interface device of claim 1, wherein the first signal source includes a plurality of line drivers that drive interdependent signals that are combined to one interdependent signal at the output of the first transformer.

15. A communication interface device comprising:
communication interface circuitry including:
a transmit path between a signal source and an alternating current power line, the transmit path including at least a first transformer and series coupled second transformer with secondary-to-primary ratios greater than one, the transmit path including at least one line driver coupled to the first transformer;
a receive path between the alternating current power line and a signal receiver, the receive path including at least the second transformer but not the first transformer, the signal source and signal receiver; and
signal coupling circuitry configured to couple to a secondary winding of the second transformer to the alternating current power line.

16. The communication interface device of claim 15, wherein the transmit path further comprises a first signal conditioner impedance matched to the first transformer, and a second signal conditioner impedance matched to the second transformer wherein the first signal conditioner is connected to the secondary windings of the first transformer and the second signal conditioner is connected to the secondary windings of the second transformer.

17. The communication interface device of claim 15, wherein the first or second transformer is a multi-tap transformer.

18. A method of communicating a communications signal, the method comprising:
before coupling to an AC Power line, generating a first data encoded communications signal;
passing the first data encoded communications signal through a first transformer to increase a first voltage of the first data encoded communications signal to a second voltage level;
passing the first data encoded communications signal at the second voltage level through a second transformer to further increase the second voltage level of the first data encoded communications signal to a third voltage level; and
thereafter, coupling the first data encoded communications signal at the third voltage level to the AC power line via a signal coupler.

19. The method of claim 18 further comprising:
receiving a second data encoded communications signal at the third voltage level from the AC power line via the signal coupler;
passing the received second data encoded communications signal through the second transformer to reduce the third voltage level of the second data encoded communications signal to the second voltage level;
passing the second data encoded signal at the second voltage level through the first transformer to further reduce the second voltage level of the second data encoded communications signal to the first voltage level; and
decoding the second data encoded communications signal.

20. The method of claim 18 further comprising:
receiving a second data encoded communications signal at the third voltage level from the AC power line via the signal coupler;
passing the received second data encoded communications signal through the second transformer to reduce the third voltage level of the second data encoded communications signal to the second voltage level;
passing the second data encoded signal at the second voltage level through a third transformer not coupled in series with the first transformer; and
decoding the second data encoded communications signal.

\* \* \* \* \*